Sept. 20, 1955  A. C. OMBERG ET AL  2,718,061
AUTOMATIC POSITION PLOTTER
Filed Oct. 10, 1946  3 Sheets-Sheet 1
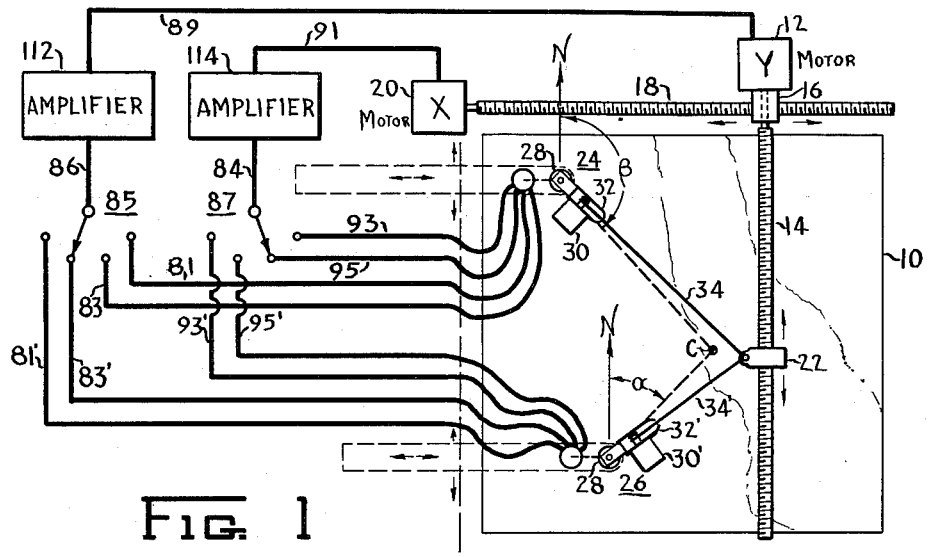
Fig. 1
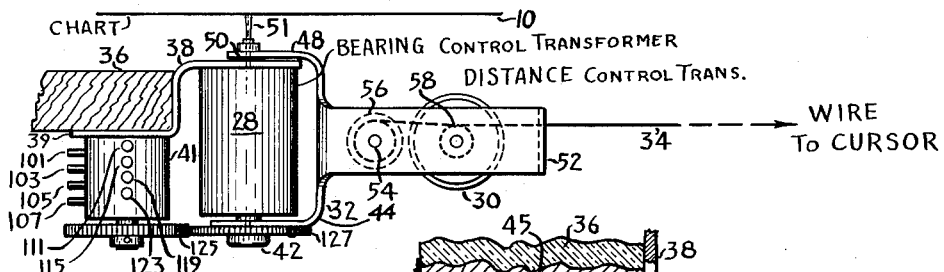
Fig. 2
Fig. 2 [a]
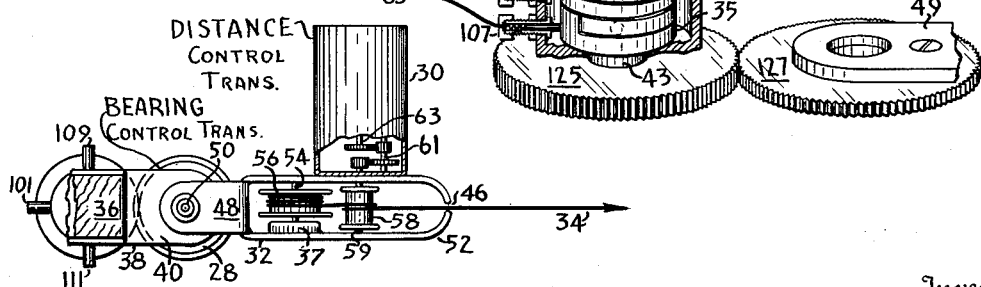
Fig. 3
Inventor
ARTHUR C. OMBERG
CLEMENT P. MEANS
BERTHOLD H. OCHTERBECK
By Robert J. Killman
Attorney Sept. 20, 1955     A. C. OMBERG ET AL     2,718,061

AUTOMATIC POSITION PLOTTER

Filed Oct. 10, 1946     3 Sheets-Sheet 2

Inventor
ARTHUR C. OMBERG
CLEMENT P. MEANS
BERTHOLD H. OCHTERBECK
By Robert T. Killman
Attorney

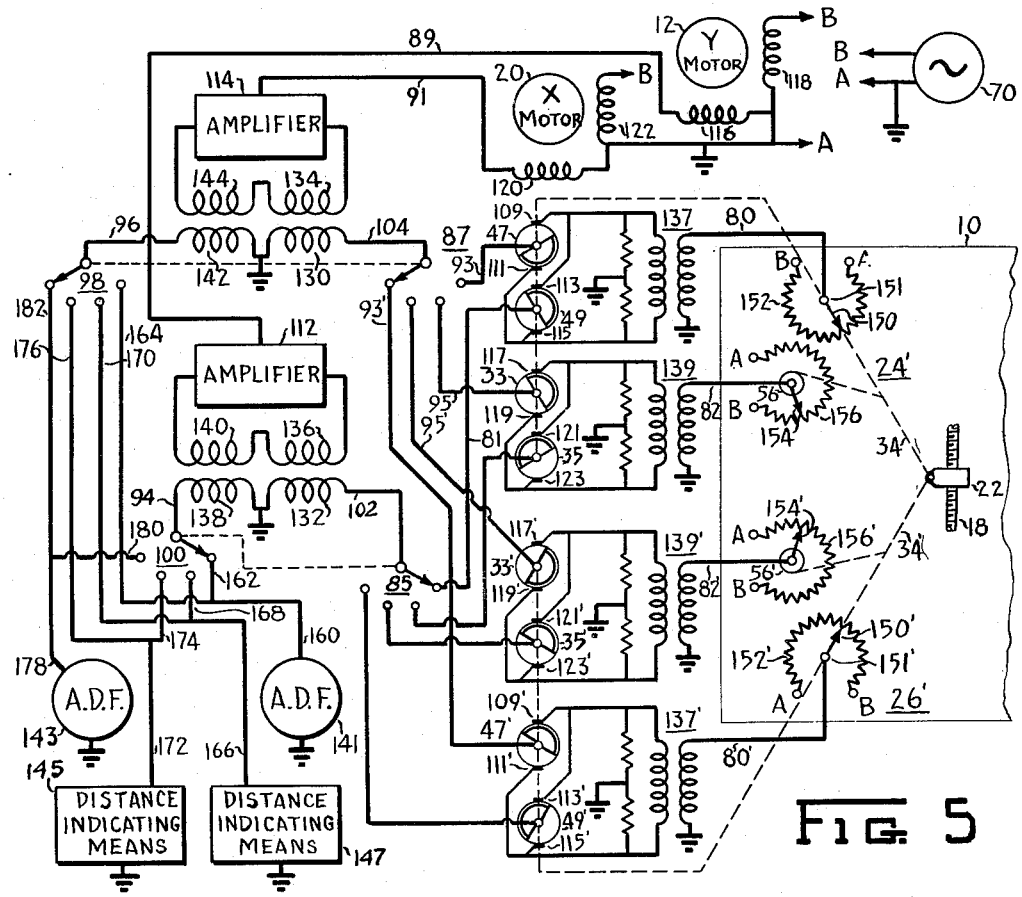

United States Patent Office 2,718,061
Patented Sept. 20, 1955

2,718,061

AUTOMATIC POSITION PLOTTER

Arthur C. Omberg, Owings Mills, Clement P. Means, Baltimore, and Berthold H. Ochterbeck, Parkton, Md., assignors to Bendix Aviation Corporation, Towson, Md., a corporation of Delaware Application October 10, 1946, Serial No. 702,412

18 Claims. (Cl. 33—1)

This invention relates to an automatic position plotter and more particularly to such a device which will automatically plot the position of a vehicle on a chart of the area in which the vehicle is located from information as to any one of a number of different combinations of position determining relationships between said vehicle and one or more points of known location in said area.

In the navigation of modern high speed sea and airborne vehicles, particularly in the case of aircraft, the older forms of navigation which relied upon celestal observations have proven too time consuming and undependable to be relied upon. Even when weather permits the taking of observations, the navigator of an aircraft finds that by the time he has taken his sights and computed the results the craft is far from the point where the sights were taken.

There has been a tendency to supplant the older systems of navigation with various radio aids, but any system which entails the manual computation and plotting of position involves delays and personal errors which may well endanger the safety of the craft. To eliminate these delays a number of systems for automatically indicating or plotting position from information supplied by radio aids have been proposed. However, such systems have possessed defects such as excessive bulk and weight, unreliability and the requirement of additional skilled personnel for their operation.

The application of Arthur C. Omberg, Ser. No. 642,969, for "Automatic Position Plotter," filed January 23, 1946, now U. S. Patent No. 2,569,328, granted September 25, 1951, discloses a system free from such defects. However, its operation depends upon the employment of a computer which transforms the positional information received, which is usually of a polar nature, into voltages proportional to the rectangular coordinates of the position of the vehicle. Additionally, the computer employed must be differently arranged for different types of positional information. The present invention eliminates the necessity for the employment of a computer, utilizing voltages which are functions of the polar information received to drive a position indicating means along directions which constitute a rectangular coordinate system.

It is an object of this invention to provide a means for automatically plotting the position of a vehicle with respect to a chart of the area in which the vehicle is located, said means being operable by the application thereto of information as to any one of a plurality of different trigonometric relationships determinative of the position of the vehicle with respect to one or more points of known location in said area.

It is another object of the invention to provide a means which will automatically plot the position of a vehicle in terms of the rectangular coordinates thereof upon actuation by polar information of the position of the said vehicle with respect to one or more points of known location in said area, without the necessity for first converting said information into terms of said rectangular coordinates.

It is a further object of the invention to provide a motor driven position indicating device operable by the application to said driving motors of polar information defining the position of a vehicle with respect to one or more points of known location in an area being traversed, to generate the position of said vehicle in terms of rectangular coordinates referred to said area.

The objects and advantages of the invention are realized by an arrangement involving the use of a motor driven cursor travelling over a map or chart of the area being traversed. The cursor is driven by a pair of motors, each of which drives it along a respective coordinate of a rectangular system of coordinates referred to an arbitrarily chosen point of the area. The motors are excited by voltages related to the degree of correspondence between the instantaneous position of the cursor and the current position of the vehicle, as defined by polar information received by the vehicle relative to its position with respect to one or more points of known location in the area. These voltages may be developed by positioning at locations on the chart corresponding to those points, synchro control transformers which form portions of error-measuring systems, the control transformers being excited by remotely located synchro transmitters the rotors of which are positioned in accordance with voltages related to the above mentioned polar information. The control transformer voltage outputs are used to excite the cursor driving motors, the control transformers being physically connected to the cursor in a follow-up relationship. Potentiometers connected across fixed voltage sources may be substituted for the control transformers.

Other objects and advantages of the invention will become apparent from a consideration of the following specification when taken in connection with the accompanying drawing, in which:

Fig. 1 is a bottom plan view of a chart and an automatic position plotter associated therewith in accordance with the invention, the plotter being diagrammatically shown;

Fig. 2 is a side elevational view of one of the control transformer assemblies shown in Fig. 1;

Fig. 2a is a side elevational view of the sense switching means forming a part of the transformer assembly of Fig. 2, a portion thereof being broken away;

Fig. 3 is a top plan view of the assembly shown in Fig. 2;

Fig. 5 is a schematic diagram of the circuits employed in a variation of the system of Figs. 1 to 4 using potentiometers connected across fixed voltage sources as a modification of the error-measuring means of that system.

Figure 6:
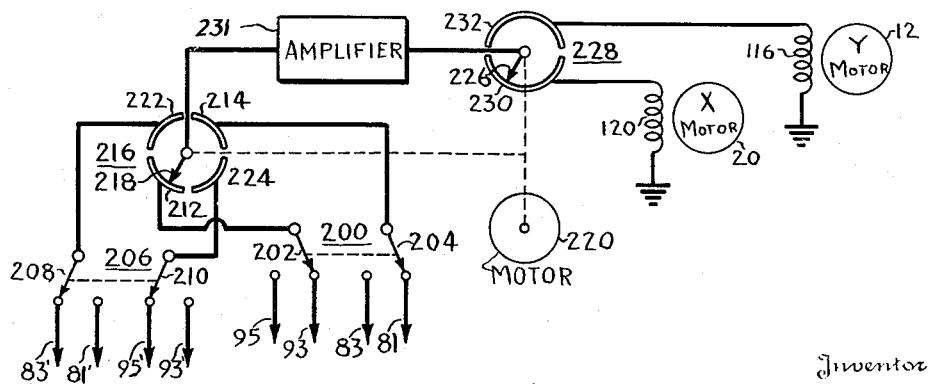

Fig. 6 is a schematic diagram of a variation of the switching arrangement used in the system of Figs. 1 to 4 for the application of the outputs of the error-measuring systems to the cursor driving motors; and Fig. 7 is a schematic diagram of a variation of the switching arrangement used in the system of Fig. 5 to compare the voltages derived from the cursor driver potentiometers and those derived from the sources of polar position information and to apply the resultant voltages to the cursor driving motors.

Referring now more particularly to the drawings, there is shown in Fig. 1 a rectangular chart or map 10 of an area being traversed by a vehicle, the chart being viewed from beneath. Positioned adjacent to one corner of the chart is a motor 20 which will be termed the X motor. The X motor drives a long lead screw 18 which parallels one dimension of the chart and on which travels a cursor 16. Journalled in the cursor 16 is one end of a long lead screw 14 which extends parallel to the remaining dimension of the chart. The lead screw 14 is mounted to move across the chart in parallel motion with the movement of the cursor 16. The means mounting the lead screw 14 for such motion may be any of several known to the art and has been omitted from the drawing for the sake of clarity. Mounted in driving relation to the lead screw 14 for movement therewith is a motor 12 which will be termed the Y motor. Mounted on the lead screw 14 is a cursor 22 which moves along the lead screw upon rotation thereof. The lead screws 14 and 18 extend with respect to the chart in directions constituting Y and X coordinates, respectively, of a system of rectangular coordinates referred to an arbitrary point of the chart, usually the lower left hand corner, as viewed from above.

Mounted beneath the chart in a manner to permit each of them to be moved to any desired position thereunder, are a pair of synchro control transformer assemblies 24 and 26 the synchro units of which form portions of error-measuring systems. The mounting means for the assemblies 24 and 26 may be constructed in accordance with any one of a number of well known arrangements permitting translational movement of each of the assemblies through an immediate supporting means, but maintaining constant the angular orientation of the supporting means during such translation. The assemblies are intended to be located beneath points on the chart concerning which the vehicle is in possession of information establishing their relative positions with respect to the vehicle. Since the construction and arrangement of the assemblies 24 and 26 and the error-measuring systems of which they form a part are identical, the corresponding components of these assemblies and of their respective error-measuring systems have been given identical reference characters, those of the assembly 26 being primed. Assembly 24 comprises a pair of control transformers 28 and 30 and assembly 26 a pair of control transformers 28' and 30'. The control transformers of assembly 24 are secured to a member 32 and those of assembly 26 to a member 32'.

A more detailed showing of the assembly 24 may be seen in Figs. 2 and 3. The mounting means for the assembly is shown as a member 36, upon which is secured an angle-shaped bracket 38, which acts as the immediate supporting means of the assembly, the free end 40 of the bracket being fixed to the upper end of the housing of control transformer 28, which is positioned with its axis extending vertically. The control portion of the bracket extends downwardly across the end of the member 36 to which it is secured, and the remaining end 39 of the bracket is bent to lie under and against the member 36.

The member 32 terminates at one end in a C-shaped portion comprising a pair of arms 48 and 44 which span the control transformer 28 and are secured to the ends of the rotor shaft 50 thereof for rotation with the shaft. The shaft 50 is hollow. Positioned on the arm 44 and enclosing the lower end of the shaft 50 is a lamp housing 42 containing a light source, which directs a beam of light through the hollow shaft 50. The beam of light, as shown at 51, impinges upon the under side of the chart 10, thus producing a spot of light visible from above the chart and marking the location of the axis of the control transformer 28.

Secured to the underside of the portion 39 of bracket 38 is the housing 41 of a sense switching mechanism which is more fully illustrated in Fig. 2a.

The housing 41 is cylindrical, the upper end piece thereof being fastened to the bracket portion 39. Journalled in the end pieces of the housing is a shaft 43. A cylinder 45, of insulating material is mounted on the shaft 43 for rotation therewith. Embedded in the periphery of the cylinder are four contact rings 47, 49, 33 and 35. The lower portion of each ring extends completely around the circumference of the cylinder and acts as a slip ring while the upper portion extends around half the circumference of the cylinder and acts as a commutator segment. The commutator portions of the rings are angularly disposed about the circumference of the cylinder in a manner and for a purpose to be described later.

Carried by the casing 41 are four brushes 101, 103, 105 and 107 to which are respectively connected four conductors 93, 81, 95 and 83. These brushes contact the slip ring portions of rings 47, 49, 33 and 35 respectively.

Also carried by the casing 41 and oppositely disposed for contact with respective commutator sections of rings 47, 49, 33 and 35 are pairs of brushes 109, 111; 113, 115; 117, 119; and 121, 123.

Secured to the lower end of shaft 43 is a gear which meshes with a gear 127 secured to the shaft 50. These gears translate motion in a one to one ratio.

Extending from the back of the C-shaped portion of the member 32 and normal to the axis of the shaft 50 is a flat sided metal loop 52, to one side of which is secured the housing of the control transformer 30. Mounted within the loop 52, adjacent to the C-shaped portion of the member, as more clearly seen in Fig. 3, is a reel 56 upon which is wound one end of the wire 34. The reel is mounted on a shaft 54 journalled in the sides of the loop. Around one end of the shaft 54 is positioned a spring reel 37 which biases the reel 56 in a direction tending to maintain the wire 34 under tension.

Also mounted in the loop 52 is a spool 58 around which is wound one or more loops or turns of wire 34 after it leaves the reel 56. The spool 58 is mounted on a shaft 59 which is journalled in the side walls of the loop 52, one end passing through the wall of the loop and being connected through a gear train 61 to the rotor shaft 63 of the control transformer 30. The gear train 61 is of such a nature as to cause the rotor of control transformer 30 to make no more than one complete rotation for the maximum possible movement of the wire 34 in the shift of the cursor 22 between any two positions on the chart. The use of the spool 58 eliminates errors which otherwise might arise due to variations in the number of layers of wire on the reel 56. After leaving the spool 58 the wire 34 emerges from the loop 52 through a beaded opening 46.

In accordance with the invention, the cursor 22 represents the moving vehicle. The assembles 24 and 26 actuate the motors 12 and 20 to drive the cursor 22 to a position with respect to the chart 10 which agrees with information reaching the vehicle indicative of its position with respect to the points of known location represented by the assemblies.

Figure 4:
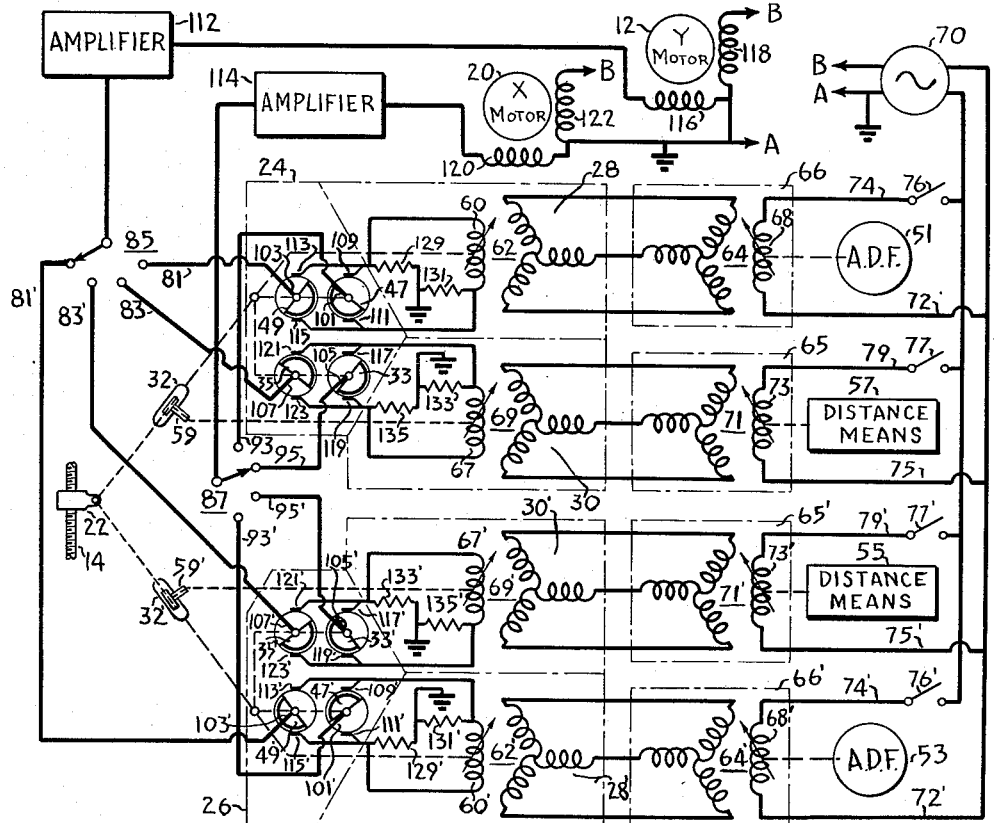
Fig. 4 is a schematic diagram of the electrical circuits employed in the plotter of Fig. 1.

This result may be accomplished by means of circuit arrangements which are shown schematically in Fig. 4. This figure shows in schematic diagram the circuit arrangements of the error-measuring systems of which the control transformers of the assemblies 24 and 26 form a part. Since the assemblies 24 and 26, and the error-measuring systems of which their control transformers form a part, are identical, only those elements pertaining to the assembly 24 will be described. On the drawing corresponding elements of the two assemblies in their respective systems have been given corresponding reference characters, those pertaining to the assembly 26 being primed. The control transformer 28 comprises a rotor winding 60 and a three coil, star-connected, stator winding 62. The coils of the stator winding are each connected to a corresponding coil of a three coil star-connected, stator winding 64 of a synchro transmitter 66 which may be remotely located. The transmitter 66 is provided with a rotor coil 68. The control transformer 28 and its associated transmitter 66 constitute a conventional synchro system which may be of the type known to the art as "Austosyn" systems. The rotor coil 68 is connected across a source 70 of alternating current by leads 72 and 74, switch 76 being provided in the lead 74. The rotor 68 is mechanically rotated by the output of some direction indicating means 51 which might be, for example, an automatic direction finder or the directional antenna of a radio pulse echo system. The rotor 68 is thus caused to assume a position commensurate with the bearing of a point on the chart 10, at which point the control transformer assembly is positioned.

The rotor 60 is carried by the shaft 50 of control transformer 28 for rotation therewith. Its position with respect to the stator 62 which is carried by the housing of transformer 28 is therefore determined by the angular position of the cursor 22 with respect to the assembly 24, the mechanical linkage being indicated in Fig. 4 by a dashed line connecting the member 32 with the rotor 60. The ends of the rotor 60 are connected together through resistors 129 and 131 in series, the common terminal of the resistors being grounded. One end of the rotor 60 is also connected to the brushes 109 and 113 while the other end is connected to the brushes 111 and 115 which form part of the sense switching arrangement described above in connection with Figs. 2, 2a and 3.

The conductor 93, which is connected by brush 101 to the slip ring portion of contact 47, terminates at its other end in a contact of a single pole, four-position switch 87. Conductor 81 which is connected by brush 103 to the slip ring portion of contact 49, terminates at its other end in a contact of a single-pole, four-position switch 85.

The wiper arm of switch 85 is connected through an amplifier 112 to a control winding 116 of the Y motor 12. The wiper arm of switch 87 is connected through an amplifier 114 to the control coil 120 of X motor 20. The motors 12 and 20 are of the two-phase variety, and are supplied with reference exciting voltages through coils 118 and 122 respectively, which are connected to the power source 70.

The operation of the portion of the system which has just been described will now be set forth. When information is received at the vehicle with respect to the bearings of two points of known location in the area being traversed, the assemblies 24 and 26 are positioned beneath the chart so that the light beams associated therewith illuminate the respective points on the chart 10. The rotors 68 and 68' may be positioned either by hand or by means of signals derived from direction indicating mechanisms 51 and 53, so that these rotors take up positions commensurate with the bearings of the moving vehicle with respect to these points of known location. Voltages will now be generated across the rotors 60 and 60' of the control transformers 28 and 28' respectively, commensurate with the displacement between these rotors and the respective rotors 68 and 68'. By proper manipulation of the switches 85 and 87 each of the rotors 60 and 60' may be connected to a respective one of the motors 12 and 20. Control voltage is applied to each of the motors in such a sense as to cause the cursor 22 to be driven along each of the X and Y coordinates in directions tending to drive the rotors 60 and 60' toward correspondence with the rotors 68 and 68'. As lack of coincidence between these rotors is reduced, the voltages generated across rotors 60 and 60' are correspondingly reduced, with the result that when correspondence is reached between the respective rotors the control voltage has been reduced to zero.

Control of the sense of the application of the control voltages developed across the rotors 60 and 60' of the control transformers 28 and 28' respectively is provided by the sense switching arrangement described. Considering the chart to be orientated in the conventional manner with the North or 0° direction pointing toward its upper edge, the phase of the control voltage necessary to drive the cursor along the X axis for a change of angle in a given sense must change when the wires 34 or 34' pass through 90° and 270°. When driving the cursor the Y axis the control voltage phase must change when the wires 34 or 34' pass through 0° and 180°. The contacts 47, 49 and 47', 49' are arranged to provide phase reversal at those points.

Each motor may be controlled by either of the rotors 60 or 60' and selection of motor controls will depend upon the position of the vehicle with respect to the reference points. For some positions of the vehicle with respect to the locations of the reference points the accuracy of the system will not be greatly affected by the selection of a particular assembly to control each motor. However, if the position of the vehicle is such that one of the wires 34 or 34' makes substantially a right angle with respect to one of the lead screws, then the assembly associated with that wire should control the motor driving that lead screw. Such a relationship produces the maximum angular movement of the wire per unit of cursor travel along the lead screw concerned.

The distance responsive control transformer of assembly 24 is indicated on Fig. 4 by the block 30. This control transformer comprises a rotor 67 driven by the shaft 59. The rotor winding 67 is coupled to a stator winding 69, comprising three star-connected coils, each of which is connected to a respective coil of a star-connected stator 71 of a transmitter 65 which may be remotely located. Coupled to the stator 71 is a rotor 73 which is energized from the source of voltage 70 through leads 75 and 79. A switch 77 is located in the lead 79. The rotor 73 is connected to be driven by the output of a distance determining means 57 such as, for example, a pulse echo distance determining system. The rotor 73 may also be positioned by hand, if desired.

The terminals of rotor 67 of control transformer 30 have connected across them the resistors 133 and 135 in series, the common contact thereof being grounded. One terminal of rotor 67 is connected to brushes 117 and 121 of the sense switching arrangement while the other terminal is connected to brushes 119 and 123. Conductor 95, one end of which is connected by brush 105 to the slip ring portion of contact 33, terminates at its other end in a contact of switch 87. Conductor 83, one end of which is connected by brush 107 to the slip ring portion of contact 35 terminates at its remaining end in a contact of switch 85.

In the operation of the portion of the system just described, when information is received as to the distance of the vehicle with respect to points of known location within the area being traversed, the assemblies 24 and 26 are positioned as before with their respective light beams illuminating those points on the chart. The switches 77 and 77' are closed and the rotors 73 and 73' are positioned, either by hand or by means of the output of their respective distance indicating means 57 and 55, so that they lie in positions commensurate with the distances to the respective points with which they are now associated, in accordance with a predetermined voltage-distance scale.

Voltages will now be developed across the rotors 67 and 67' proportional to the displacement of these rotors with respect to their respective rotors 73 and 73'. By proper manipulation of the switches 85 and 87 these voltages are applied to the control coils of the X and Y motors, as desired. Each of the control voltages will be applied in such a sense that resultant movement of the motor to which it is applied will cause the cursor 22 to be moved in a direction to reduce the control voltage. As the cursor 22 is moved the wires 34 and 34' will be wound or unwound from the respective reels 56 and 56', with resulting rotation of their associated spools 58 and 58', the shafts 59 and 59' of which drive the associated rotor shafts 63 and 63' through gear trains 61 and 61'.

The voltages across the rotors 67 and 67' will be reduced to zero when the unwound lengths of the wires 34 and 34' have been adjusted to represent the distances of the moving vehicle from the two points of known location. As was the case with the bearing responsive control transformers, each of the rotors 67 and 67' may be connected to the motor which will produce greater positional accuracy of the cursor 22 in terms of the amount of cursor travel per unit length of wire wound or unwound.

The sense switching contacts 33, 35 and 33', 35' are so orientated on the cylinder 45 that the voltages developed across the rotors 67 and 67' are applied to the X motor with changes of phase at orientations of the wires 34, 34' of 0° and 180°, while they are applied to the Y motor with changes of phase at wire orientations of 90° and 270°.

While the operation of the system has been described for inforamtion in terms either of distance or bearing of the vehicle with respect to two points, it is evident that the system is capable of use with many combinations of position indicating information. For example, the position of the moving vehicle may be determined from information as to the bearing and distance of a single point of known location by driving one motor in accordance with bearing information and the other in accordance with distance information. It may also be determined from information as to the bearing of one point and the distance to another.

While in the foregoing description the invention has been described as embodied in apparatus employing synchro control systems, the employment of such systems is not essential to the invention, as will be pointed out in connection with the embodiment illustrated in Fig. 5.

In this embodiment the motors 12 and 20 are used as before to drive the cursor 22 in cooperation with the chart 10. Assemblies 24' and 26', which may have the same outward appearance and co-act in the same manner with the wires 34 and 34' as the assemblies 24 and 26 in the embodiment just described, are likewise employed.

The assembly 24' is identical with the assembly 26', the parts of the latter assembly having been identified by the same numbers as corresponding parts of the assembly 24', the reference numerals of the parts pertaining to the assembly 26' being primed. The assembly 24' comprises a pair of potentiometers 152 and 156, which may be of the helical type, the terminals of which are connected to the terminals A and B of the A. C. source 70. These potentiometers may, if desired, be housed in housings similar to those illustrated in Figs. 2 and 3 as employed to house the control transformers 28 and 30. The potentiometer 152 is provided with a slider 150 which may be mounted for rotation with a shaft 151, which is similar in construction to the shaft 50 of the control transformer 28 in the embodiment shown in Figs. 2 and 3. This shaft is connected in the same manner as is the shaft 50 for rotation by angular movement of the wire 34 about its axis. The potentiometer 156 is provided with a slider 154 which is mounted for rotation about the axis of the potentiometer in response to the winding or unwinding of the wire 34, by a mechanism which may be identical to that shown in Figs. 2 and 3 as contained within the loop 52 and cooperating with the control transformer 30.

The amplifier 112 is, in this embodiment, connected to a circuit containing a pair of coils 140 and 136 in series. Coupled to the coil 140 is the coil 138, one terminal of which is grounded, the other terminal being connected by a lead 94 to the switch arm of a single-pole, four-position switch 100. Coupled to the coil 136 is the coil 132, one terminal of which is grounded and the other terminal of which is connected by a lead 102 to the switch arm of the switch 85.

The amplifier 114 is connected to a circuit containing a pair of coils 144 and 134 in series. Coupled to the coil 144 is the coil 142, one terminal of which is grounded and the other terminal of which is connected by a lead 96 to the switch arm of a single-pole, four-position switch 98. Coupled to the coil 134 is the coil 130, one terminal of which is grounded and the other terminal of which is connected by a lead 104 to the switch arm of switch 87.

The sliders 150, 154, 154' and 150' are connected to the contacts of switches 85 and 87 by the same sense switching arrangements and in the same order as the rotors 60, 67, 67' and 60' of the embodiment shown in Fig. 4. However, the outputs of the potentiometers may be conveniently applied to their respective sense circuits by way of coupling transformers, transformer 137 being associated with potentiometer 152, transformer 139 with potentiometer 156, transformer 139' with potentiometer 156' and transformer 137' with potentiometer 152'. The output of a direction indicating means, such as the automatic direction finder 141, is connected by a lead 160 and branch leads 162 and 164 to corresponding contacts of the single-pole, four-position switches 100 and 98. The output of a distance indicating means, indicated by the box 147, is connected by a lead 166 and branch leads 168 and 170 to corresponding contacts of the switches 100 and 98. The output of a second distance indicating means 145 is connected by a lead 172 and branch leads 174 and 176 to corresponding contacts of the switches 100 and 98. The output of a second direction indicating means 143 is connected by leads 178 and branch leads 180 and 182 to the switches 100 and 98. The switch arms of switch 100 and switch 85 are ganged together, as are the switch arms of switch 98 and switch 87.

In operation, the assemblies 24' and 26' are positioned as in the embodiment previously described, under points on the chart 10 concerning which positional information has been received. Assume, by way of example, that indications as to the bearing of the vehicle have been received over automatic direction finders 141 and 143 with respect to two points of known location on the chart 10. The assemblies 24' and 26' are positioned so that their respective light beams impinge on these points as indicated on the chart 10. The switches 85 and 100 are manipulated so that their switch arms contact the contacts terminating leads 81 and 162 respectively, thus connecting the output of potentiometer 152 to the coil 132 and the output of the direction finder 141 to the coil 138. The switch arms of the switches 98 and 87 are positioned so that they contact the contacts terminating leads 93' and 182 respectively. Thus the output of potentiometer 152' is connected to the coil 130 and the output of direction finder 143 is connected to the coil 142.

The difference between the output of direction finder 141 and the voltage intercepted on potentiometer 152 by the slider 150 is thus applied to the amplifier 112 and from there to the control coil 116 of Y motor 12. The voltage is applied to the control coil 116 in a sense to cause such movement of the cursor 22 as will diminish the difference between the voltages applied to the coils 132 and 138. When these voltages are equal the cursor 22 will cause the wire 34 to extend along the bearing of the vehicle with respect to the point associated with assembly 24'.

The switch arms of switches 87 and 98 are positioned so that they make contact with the contacts terminating leads 93' and 182 respectively. By this means the output of the potentiometer intercepted by slider 150' is applied to the coil 130 and the output of automatic direction finder 143 is applied to the coil 142. The difference between these voltages is applied to amplifier 114 and by lead 91 to control coil 120 of X motor 20. This difference is applied in the proper sense to move the cursor 22 in a direction tending to result in the difference being diminished. The movement applied to the cursor 22 by the combined action of the X and Y motors is such that when the cursor comes to rest the voltages applied to the control coils of these motors will have been reduced to zero and the cursor will have reached a position indicative of the position of the vehicle with respect to the points associated with the assemblies 24' and 26' as defined by the bearing information received.

By proper manipulation of the ganged switches, information received as to the distances of the moving vehicle from two points of known location by way of distance indicating means 145 and 147, may be applied to the control circuit of the X and Y motors to move the cursor 22 to a position indicative of the position of the veehicle with respect to the known points in terms of the distance information received. In a similar manner information as to the bearing of a vehicle from a point of known location and its distance from another point may be utilized to indicate its position by the positioning of the cursor 22. Information as to the bearing and distance of the vehicle with respect to a single point of known location may also be utilized by driving one motor in accordance with the bearing information and the other in accordance with the distance information.

It has been pointed out above that maximum accuracy of cursor positioning requires its movements along a particular coordinate to be controlled by the voltage source, the angular displacement of whose wire makes more nearly a right angle with that coordinate. Where two sources are providing control voltage it is necessary, in the arrangements previously described, for the navigator to select the source to control each motor and to apply the control voltages in the manner selected, by the operation of switches.

In order to relieve the navigator of this task and to insure the automatic attainment of maximum accuracy the switching arrangement shown in Fig. 6 may be employed to advantage.

In this arrangement the leads 95, 93, 83 and 81 of the circuit of Fig. 4 terminate in contacts, arranged in the order shown, of a double-pole, double-throw switch 200, having switch arms 202 and 204. The leads 83', 81', 95' and 93' terminate in contacts, arranged in the order shown, of a double-pole, double-throw switch 206, having switch arms 208 and 210.

Switch arms 202 and 204 are connected, respectively, to oppositely disposed quarter circle segments 212 and 214 of a commutator 216 having a brush 218 driven by a motor 220. Switch arms 208 and 210 are connected respectively, to oppositely disposed quarter circle segments 222 and 224 of the commutator. The motor 220 likewise drives, synchronously with the brush 218, a brush 226 of a commutator 228 having two half circle segments 230 and 232 connected respectively to control coils 120 and 116 of X motor 20 and Y motor 12. The brushes of the two commutators are so driven that brush 218 covers segments 222 and 214 while brush 226 is covering segment 232. The remaining segments of commutator 216 are covered while brush 226 covers segment 230. An amplifier 231 is connected between the two brushes.

In operation, the switches 200 and 206 are manually set for the application to the commutator 216 of control voltages corresponding to the available positional information. The switch 200 is shown with its contacts set to the terminals of leads 93 and 81. Through lead 93 the output of rotor 60 of control transformer 28 is made available by way of sense switching contact 47 at commutator segment 212. Since brush 218 is contacting this segment at the same time brush 226 is contacting segment 230, the amplified output of transformer 28 will be applied to the X motor control coil.

Through lead 81 the output of transformer 28 is made available at commutator segments 214 and, by the synchronized operation of the two commutator brushes, will only be applied to the Y motor control coil.

Likewise through switch 206, set as shown, the output of transformer 30' is available by way of sense switching segment 35' at commutator segment 222, and by way of sense switching segment 33' at commutator segments 224, for application to the Y and X motor control coils, respectively.

The motor 220 may operate continuously, thus sequentially applying to the X motor control coil the outputs of any selected pair of control transformers through proper sense switching contacts for X motor operation, and sequentially applying to the Y motor control coil 116 the outputs of the same transformers through the proper sense switching contacts for Y motor operation.

By this means a high degree of accuracy is attained since each transformer in use has its turn at controlling each motor. The transformer which is so positioned as to control a particular motor with a greater degree of accuracy will act as a fine control means and the other transformer as a coarse control means. The positioning effected by the fine control means will not be changed by the coarse control means.

Fig. 7 illustrates a motor driven switching system which will accomplish the same results with the potentiometer arrangement of Fig. 5 that the switching system of Fig. 6 accomplishes with respect to the self synchronous control voltage sources of Fig. 4.

In this switching system there is provided a commutator 234 having quarter circle segments 236, 238, 240 and 242. The brush 244 of this commutator is ganged with brush 218 of commutator 216 and sequentially sweeps the segments 238, 242, 236 and 240 in synchronism with the sequential sweeping of segments 214, 224, 212 and 222 by the brush 218.

Segments 236 and 238 are connected to the switch arm 246 of a single-pole, double-throw switch 248, which is ganged with switch 200. Segments 240 and 242 are connected to the switch arm 250 of a single-pole double-throw switch 252, which is ganged with switch 206.

The output lead 172 of distance determining means 145 and the output lead 178 of automatic direction finder 143 terminate in the contacts of switch 252, which contacts are arranged in the order shown with respect to the contacts of switch 206. Likewise, the output lead 166 of distance determining means 147 and the output lead 160 of automatic direction finder 141 terminate in the contacts of switch 248 in the order shown with respect to the contacts of switch 200.

The brush 244 is connected to one terminal of the primary winding of a transformer 254, the other terminal of the primary being grounded. The brush 218 is connected to one terminal of the primary winding of a transformer 256, the other terminal of the primary being grounded. The secondary windings of the transformers 254 and 256 are serially connected in the input circuit of amplifier 231, the output of which is applied to the brush 226 of commutator 228 as in Fig. 6.

By the switching arrangement of Fig. 7 the difference between the output of distance determining means 145 and the voltage derived from the potentiometer 156' is applied through the amplifier 112 to the X and Y motor control coils in sequence. Likewise the difference between the output of automatic direction finder 143 and the voltage derived from potentiometer 152', between the output of distance determining means 147 and the voltage derived from potentiometer 156, and between the output of automatic direction finder 141 and the voltage desrived from potentiometer 152 are similarly applied, depending of course upon the positioning of ganged switches 200 and 248 and ganged switches 206 and 252. The same results as to the automatic attainment of the best accuracy of positioning of the cursor 22 are achieved as by the arrangement of Fig. 6.

It should be noted that the circuits of Figs. 6 and 7 eliminate one amplifier from the arrangements of Figs. 4 and 5.

While the disclosure of the invention has been limited to the embodiments which are now preferred, it is to be understod that the scope of the invention is not to be considered as limited to these embodiments, since many variations in form and arrangement, falling within the scope of the invention as defined by the appended calims will suggest themselves to those skilled in the art.

What is claimed is:

1. An automatic position plotter comprising: means for deriving voltages which are functions of polar coordinates defining the position of a vehicle in an area; a chart of said area; a position marking means; a synchro system driven by said position marking means and having said derived voltages applied thereto, said synchro system further deriving from said derived voltages error voltages which are functions of the derivations of the polar coordinates of said marking means from the polar coordinates on said chart of the position of said vehicle; and means responsive to said error voltages to drive said position marking means across said shart along directions which constitute rectangular coordinates of said chart, in such sense as to reduce said deviations.

2. An automatic position plotter comprising: means for deriving voltages which are functions of polar coordinates defining the position of a vehicle in an area with respect to one or more points of known location in said area; a chart of said area; a position marking means a synchro system driven by said position marking means and having said derived voltages applied thereto, said synchro system further deriving from said derived voltages error voltages which are functions of the derivations of the polar coordinates of said marking means with reference to said points as represented on said chart from the said polar coordinates defining the position of said vehicle with respect to said points; and means responsive to said error voltages to drive said position marking means across said chart along directions which constitute rectangular coordinates of said chart, in such sense as to reduce said deviations.

3. An automatic vehicle position plotter comprising: a chart of the area in which said vehicle is located; a source of voltage; a position marking means; a pair of voltage responsive means each operable to drive said position marking means across said chart along a direction constituting a rectangular coordinate of said chart, a pair of error-measuring systems, each comprising a synchro transmitter and a control transformer conductively connected thereto; means mounting said control transformers into a unit; means mounting said unit for positioning adjacent to said chart in juxtaposition to the representation thereon of a point of known location in said area; means connecting said transmitters to said source; means regulating the electro-magnetic coupling of the elements of the transmitter of one of said systems as a function of the bearing of said vehicle with respect to said point of known location in said area; means regulating the electro-magnetic coupling of the elements of the transmitter of the other of said systems as a function of the distance of said vehicle to said point; means regulating the electro-magnetic coupling of the elements of the control transformer of said one of said systems as a function of the bearing of said marking means with respect to said representation; means regulating the electro-magnetic coupling of the elements of the control transformer of said other of said systems as a function of the distance of said marking means to said representation; and means for impressing the output of each of said control transformers upon a respective one of said voltage responsive driving means as control voltage in a sense to drive said marking means to a location on said chart corresponding to the position of said vehicle in said area.

4. An automatic vehicle position plotter comprising: a chart of the area in which said vehicle is located; a source of alternating voltage; a position marking means; a pair of voltage responsive means each operable to drive said position marking means across said chart along a direction constituting a rectangular coordinate of said chart; a pair of error-measuring systems, each comprising a synchro transmitter and a control transformer conductively connected thereto; means mounting each of said control transformers in juxtaposition to a representation on said chart of a point of known location in said area; means connecting said transmitters to said source; means regulating the electro-magnetic coupling of the elements of each of said transmitters as a function of the bearing of said vehicle with respect to a respective one of said points; means regulating the electro-magnetic coupling of the elements of each of said control transformers as a function of the bearing of said position marking means to corresponding ones of said representations; and means for impressing the output of each of said control transformers upon a respective one of said voltage responsive driving means as control voltage in a sense to drive said marking means to a location on said chart corresponding to the position of said vehicle in said area.

5. An automatic vehicle position plotter comprising: a chart of the area in which said vehicle is located; a source of auternating voltage; a position marking means; a pair of voltage responsive means each operable to drive said position marking means across said chart along a direction constituting a rectangular coordinate of said chart; a pair of error-measuring systems, each comprising a synchro transmitter and a control transformer conductively connected thereto; means mounting each of said control transformers in juxtaposition to a representation on said chart of a point of known location in said area; means connecting said transmitters to said source; means regulating the electro-magnetic coupling of the elements of each of said transmitters as a function of the distance of said vehicle from a respective one of said points; means regulating the electro-magnetic coupling of the elements of each of said control transformers as a function of the distance of said position marking means to corresponding ones of said representations; and means for impressing the output of each of said control transformers upon a respective one of said voltage responsive driving means as control voltage in a sense to drive said marking means to a location on said chart corresponding to the position of said vehicle in said area.

6. An automatic vehicle position plotter comprising: a chart of the area in which said vehicle is located; a source of alternating voltage; a position marking means; a pair of voltage responsive means each operable to drive said position marking means across said chart along a direction constituting a recetangular coordinate of said chart; a pair of error-measuring systems, each comprising a synchro transmitter and a control transformer conductively connected thereto; means mounting each of said control transformers in juxtaposition to a representation on said chart of a point of known location in said area; means connecting said transmitters to said source; means regulating the electro-magnetic coupling of the elements of the transmitter and the control transformer of one of said systems as functions, respectively, of the distance of said vehicle from the one of said points to the representation of which said control transformer is juxtaposed, and of the distance of said position marking means from said representation; means regulating the electro-magnetic coupling of the elements of the transmitter and the control transformer of the other of said systems as functions respectively of the bearing of said vehicle from the other of said points, and of the bearinng of said position marking means from the other of said representations; and means to impress the outputs of each of said control transformers upon a respective one of said voltage responsive driving means as control voltage in a sense to drive said marking means to a location on said chart corresponding to the position of said vehicle in said area.

7. An automatic position plotter for a vehicle comprising: a chart of the area in which said vehicle is located; a source of alternating voltage; a position marking means; a pair of voltage responsive driving means each driving said position marking means across said chart in a direction constituting a coordinate of a system of rectangular coordinates referred to said chart; a pair of angle responsive error-measuring systems each comprising a synchro-transmitter and a control transformer conductively connected thereto; means regulating the electro-magnetic coupling between the elements of each of said transmitters as a function of the bearing of said vehicle with respect to a respective point of known location in said area; a pair of distance responsive error-measuring systems each comprising a synchro transmitter and a control transformer conductively connected thereto; means regulating the electro-magnetic coupling between the elements of each of the last named transmitters as functions of the distance of said vehicle to a respective one of said points; means connecting all of said transmitters to said source; means mounting as a unit the control transformers of the ones of said systems responsive to the bearing and distance of the vehicle with respect to one of said points; means mounting said unit in juxtaposition to the representation on said chart of said one of said points; means regulating the electro-magnetic coupling of the elements of said transformers respectively as function of the bearing and distance of said position marking means from said representation; means mounting the remaining transformers as a unit; means mounting said unit in juxtaposition to the representation on said chart of the other of said points; means regulating the electro-magnetic coupling of the elements of said remaining transformers respectively as functions of the bearing and distance of said position marking means from the last named representation; means controlling the phase of the outputs of said transformers; means applying the output of one of said angle responsive transformers and the output of one of said distance responsive transformers in alternation to each of said voltage responsive driving means, the phase of the output voltages of said transformers being such that said marking means will be driven to a location on said chart corresponding to the position of said vehicle in said area.

8. An automatic vehicle position plotter comprising: a chart of the area in which said vehicle is located; a source of alternating voltage; a position marking means; a pair of voltage responsive means each operable to drive said position marking means across said chart along a direction constituting a rectangular coordinate of said chart; a pair of error-measuring systems, each comprising a synchro transmitter and a control transformer conductively connected thereto; means mounting said control transformers into a unit; means mounting said unit for positioning adjacent to said chart in juxtaposition to the representation thereon of a point of known location in said area; means connecting said transmitters to said source; means regulating the electro-magnetic coupling of the elements of the transmitter of one of said systems as a function of the bearing of said vehicle with respect to said point of known location in said area; means regulating the electro-magnetic coupling of the elements of the transmitter of the other of said systems as a function of the distance of said vehicle to said point; means regulating the electro-magnetic coupling of the elements of the control transformer of said one of said systems as a function of the bearing of said marking means with respect to said representation; means regulating the electro-magnetic coupling of the elements of the control transformer of said other of said systems as a function of the distance of said marking means to said representation; and means for impressing the output of a selected one of said control transformers sequentially upon said voltage responsive driving means in a sense to cause said marking means to be driven to a location on said chart corresponding to the position of said vehicle in said area.

9. An automatic vehicle position plotter comprising: a chart of the area in which said vehicle is located; a source of alternating voltage; a position marking means; a pair of voltage responsive means each operable to drive said position marking means across said chart along a direction constituting a rectangular coordinate of said chart; a pair of error-measuring systems, each comprising a synchro transmitter and a control transformer conductively connected thereto; means mounting said control transformers into a unit; means mounting said unit for positioning adjacent to said chart in juxtaposition to the representation thereon of a point of known location in said area; means connecting said transmitters to said source; means regulating the electro-magnetic coupling of the elements of the transmitter of one of said systems as a function of the bearing of said vehicle with respect to said point of known location in said area; means regulating the electro-magnetic coupling of the elements of the transmitter of the other of said systems as a function of the distance of said vehicle to said point; means regulating the electro-magnetic coupling of the elements of the control transformer of said one of said systems as a function of the bearing of said marking means with respect to said representation; means regulating the electro-magnetic coupling of the elements of the control transformer of said other of said systems as a function of the distance of said marking means to said representation; impedance means dividing the output of each of said systems into a pair of voltages of opposite phase; means selectively making available to each of said voltage responsive driving means as control voltage, one of said voltages of opposite phase, said available voltages being selected to drive said position marking means in a direction to reduce the magnitude of outputs of said systems; and means for impressing the selected voltages derived from a chosen one of said systems upon said respective voltage responsive driving means.

10. An automatic position plotter comprising: means for generating a pair of voltages which are functions respectively of the bearing and distance of a vehicle with respect to a point of known location in an area in which said vehicle is located; a chart of said area; a position marking means; a pair of voltage responsive means for driving said position marking means across said chart along directions which constitute coordinates of a system of rectangular coordinates referred to said chart; follow-up means positioned at said point as indicated on said chart, said follow-up means being responsive respectively to the bearing and distance of said position marking means with respect to said indication of said point to generate voltages which are functions thereof, means combining said generated voltages which are functions of said bearings and said generated voltages which are functions of said distances to produce a pair of resultant voltages, said generated voltages being combined in a sense such that the magnitudes of the said resultant voltages are reduced as said position marking means approaches the position on said chart defined by the first mentioned generated voltages as the position of said vehicle, and means applying each of said resultant voltages to a respective one of said driving means as control voltage.

11. An automatic position plotter comprising: means for generating a pair of voltages which are functions of the bearings of a vehicle with respect to two points of known location in an area in which said vehicle is located; a chart of said area; a position marking means; a pair of voltage responsive means for driving said position marking means across said chart along directions which constitutee coordinates of a system of rectangular coordinates referred to said chart; follow-up means positioned at said points as indicated on said chart, said follow-up means being responsive respectively to the bearings of said position marking means with respect to said points to generate voltages which are functions thereof, means combining said generated voltages which are functions of corresponding bearings of said vehicle and said position marking means to produce a pair of resultant voltages, said generated voltages being combined in a sense such that the magnitudes of said resultant voltages are reduced as said position marking means approaches the position on said chart corresponding to the position defined by said first mentioned generated voltages as the position of said vehicle, and mean applying each of the said resultant voltages to a respective one of the said driving means as control voltage.

12. An automatic position plotter comprising: means for generating a pair of voltages which are functions respectively of the distances of a vehicle with respect to two points of known location in an area in which said vehicle is located; a chart of said area; a position marking means; a pair of voltage responsive means for driving said position marking means across said chart along directions which constitute coordinates of a system of rectangular coordinates referred to said chart; follow-up means positioned at said points as indicated on said chart, said follow-up means being responsive respectively to the distances of said position marking means with respect to said points as indicated on said chart to generate voltages which are functions thereof, means combining said generated voltages which are functions of corresponding distances of said vehicle and said marking means with respect to said points and said indications respectively, to produce a pair of resultant voltages, said generated voltages being combined in a sense such that the magnitudes of said resultant voltages are reduced as said position marking means approaches the position defined by said first mentioned generated voltages as the position of said vehicle, and means applying each of the said resultant voltages to a respective one of said driving means as control voltages.

13. An automatic position plotter for a vehicle comprising: a chart of the area in which said vehicle is located; a source of alternating voltage, a position marking means, a pair of voltage responsive means each driving said position marking means across said chart in a direction constituting a coordinate of a system of rectangular coordinates referred to said chart; a pair of means each supplying a voltage component commensurate with the bearing angle of said vehicle with respect to a selected respective point of known location in said area; a pair of means each supply a voltage component commensurate with the distance of said vehicle from a selected respective point of known location in said area; follow-up means comprising a pair of units, each positionable adjacent to said chart in juxtaposition to the representation thereon of one of said points, each of said units comprising a pair of variable voltage transfer elements, each of said elements being connected to said source; means operatively connecting one of said voltage transfer elements in each unit to said marking means in such a manner that its output is responsive to the angular relationship of said marking means with respect to the unit of which it is a part; means connecting the other of said voltage transfer elements in each unit to said position marking means in a manner to render its output responsive to the distance of said position marking means with respect to the unit of which it forms a part; phase control means for the outputs of said voltage transfer elements; means for combining the output of each of said angle responsive voltage transfer elements with a respective one of said vehicle bearing angle voltages; and means for combining the output of each of said distance responsive voltage transfer elements with a respective one of said vehicle distance voltages; said combined voltages constituting control voltages for said driving means of such phase and magnitude as to cause said marking means to be driven to a location on said chart corresponding to the position of said vehicle in said area.

14. An automatic position plotter for a vehicle comprising: a chart of the area in which said vehicle is located; a source of alternating voltage; a position marking means; a pair of voltage responsive means each driving said position marking means across said chart in a direction constituting a coordinate of a system of rectangular coordinates referred to said chart; a pair of means each capable of supplying an output voltage commensurate with the bearing angle of said vehicle with respect to a selected respective point of known location in said area; a pair of means each capable of supplying an output voltage commensurate with the distance of said vehicle from a selected respective point of known location in said area; follow-up means comprising a pair of units, each positionable adjacent to said chart in juxtaposition to the representation thereon of one of said points, each of said units comprising a pair of variable voltage transfer elements; means operatively connecting one of said voltage transfer elements in each unit to said marking means in such a manner that its output is responsive to the angular relationship of said marking means to the unit of which it is a part, and means connecting the other of said voltage transfer elements in each unit to said position marking means in a manner to render its output responsive to the distance of said position marking means with respect to the unit of which it forms a part; means controlling the phase of the outputs of said voltage transfer elements; means sequentially combining the output of one of said angle responsive voltage transfer elements with the output of one of said bearing angle responsive voltage supplying means and the output of one of said distance responsive voltage transfer elements with the output of one of said vehicle distance responsive voltage supplying means; and means applying the resultant of each of said voltage combinations alternatively to each of said voltage responsive driving means; the phase of the output voltages of said voltage transfer elements being such that said resultant voltages will be reduced to zero when said position marking means reaches the location on said chart representative of the position of said vehicle in said area.

15. In an automatic position plotter as claimed in claim 14; said phase controlling means comprising means dividing the output of each of said voltage transfer elements into a pair of output voltages the phase of each of said output voltages being such as to cause it to exert a follow-up control action on a respective one of said driving means if applied thereto, as a component of the control voltage thereof; the said output voltages of each of said pairs being alternated in said combinations.

16. An automatic position plotter comprising: means for generating a pair of voltages which are functions respectively of the bearing and distance of a vehicle with respect to a point of known location in an area in which said vehicle is located; a chart of said area; a position marking means; a pair of voltage responsive means for driving said position marking means across said chart along directions which constitute coordinates of a system of rectangular coordinates referred to said chart; follow-up means positioned at said point as indicated on said chart, said follow-up means being responsive respectively to the bearing and distance of said position marking means with respect to said indication of said point to generate voltages which are functions thereof; means combining said generated voltages which are functions of said bearings and said generated voltages which are functions of said distances to produce a pair of resultant voltages, said generated voltages being combined in a sense such that the magnitudes of the said resultant voltages are reduced as said position marking means approaches the position on said chart defined by the first mentioned generated voltages as the position of said vehicle; and means for impressing a selected one of said resultant resultant voltages sequentially upon said voltage responsive driving means in a sense to cause said marking means to be driven toward said position in said chart defining the position of said vehicle.

17. An automatic position plotter comprising: means for generating a pair of voltages which are functions respectively of the bearing and distance of a vehicle with respect to a point of known location in an area in which said vehicle is located; a source of alternating voltage; a chart of said area; a position marking means; a pair of voltage responsive means for driving said position marking means across said chart along directions which constitute coordinates of a system of rectangular coordinates referred to said chart; follow-up means positioned at said point as indicated on said chart, said follow-up means being responsive respectively to the bearing and distance of said position marking means with respect to said indication of said point to transfer from said source voltages which are functions thereof, impedance means dividing each of the voltages transferred by said follow-up means into pair of voltages of opposite phase; means selectively combining one of said voltages derived from each of said follow-up means with each said voltage generated as a function of the respective polar quantity of said vehicle to provide a pair of resultant voltages each of which is so phased that, if applied thereto, it will cause a respective one of said voltage responsive driving means to drive said position marking means to a location on said chart corresponding to the position of said vehicle in said area; and means for selectively impressing said pair of said resultant voltages upon said respective voltage responsive driving means.

18. In an automatic position plotter, means for generating follow-up voltages comprising: a source of voltage; a chart; a unit positionable at a reference point of said chart; a position marking means cooperating with said chart; an element joining said position marking means and said unit; a first voltage transfer means in said unit connected to said source, the amplitude of the voltage transferred by said transfer means being a function of the angular orientation of said element and a second voltage transfer means in said unit connected to said source and to said element, the amplitude of the voltage transferred by said second transfer means being a function of the distance separating said marking means and said unit.

References Cited in the file of this patent

UNITED STATES PATENTS

| | | |
|---|---|---|
| 830,718 | Holt | Sept. 11, 1906 |
| 1,016,240 | Alexieff | Jan. 30, 1912 |
| 1,437,400 | Conners | Dec. 5, 1922 |
| 1,494,770 | Conners | May 20, 1924 |
| 1,551,393 | Hewlett et al. | Aug. 25, 1925 |
| 2,063,534 | Wallace | Dec. 8, 1936 |
| 2,063,906 | Boch | Dec. 15, 1936 |
| 2,127,415 | Marique | Aug. 16, 1938 |
| 2,253,430 | Hunt et al. | Aug. 19, 1941 |
| 2,360,361 | Mountbatten | Oct. 17, 1944 |
| 2,363,500 | Carter et al. | Nov. 28, 1944 |
| 2,366,772 | Ebeling | Jan. 9, 1945 |
| 2,422,025 | Luck | June 10, 1947 |
| 2,462,077 | Duggar | Feb. 22, 1949 |
| 2,485,663 | Rusch et al. | Oct. 25, 1949 |
| 2,530,428 | Gray | Nov. 21, 1950 |
| 2,541,277 | Omberg et al. | Feb. 13, 1951 |
| 2,566,247 | Pierce et al. | Aug. 28, 1951 |
| 2,569,328 | Omberg | Sept. 25, 1951 |